(12) United States Patent
Maenpa et al.

(10) Patent No.: US 8,089,402 B2
(45) Date of Patent: Jan. 3, 2012

(54) SYSTEM AND METHOD FOR CORRECTING GLOBAL NAVIGATION SATELLITE SYSTEM CARRIER PHASE MEASUREMENTS IN RECEIVERS HAVING CONTROLLED RECEPTION PATTERN ANTENNAS

(75) Inventors: Jon E. Maenpa, Redondo Beach, CA (US); Andrew M. Hautzik, Rancho Palos Verdes, CA (US); Patrick M. Sain, Torrance, CA (US)

(73) Assignee: Raytheon Company, Waltham, MA (US)

( * ) Notice: Subject to any disclaimer, the term of this patent is extended or adjusted under 35 U.S.C. 154(b) by 33 days.

(21) Appl. No.: 12/548,381

(22) Filed: Aug. 26, 2009

(65) Prior Publication Data

US 2011/0050497 A1    Mar. 3, 2011

(51) Int. Cl.
G01S 19/23 (2010.01)
H01Q 3/34 (2006.01)

(52) U.S. Cl. ............... 342/357.62; 342/372; 342/377

(58) Field of Classification Search .......... 342/357.27–357.29, 357.37, 357.38, 342/357.41, 357.62, 357.68, 368–377, 357.26, 342/358–360; G01S 19/23, 19/43; H01Q 3/00, H01Q 3/34
See application file for complete search history.

(56) References Cited

U.S. PATENT DOCUMENTS

| | | | |
|---|---|---|---|
| 5,410,321 A | 4/1995 | Gordon et al. | |
| 5,694,416 A | 12/1997 | Johnson | |
| 5,949,372 A | 9/1999 | Lennen | |
| 5,955,987 A | 9/1999 | Murphy et al. | |
| 6,049,307 A * | 4/2000 | Lim | 342/383 |
| 6,266,007 B1 | 7/2001 | Lennen | |
| 6,469,667 B2 | 10/2002 | Fox et al. | |
| 6,642,898 B2 | 11/2003 | Eason | |
| 6,727,846 B1 * | 4/2004 | Brown | 342/357.63 |
| 6,744,408 B1 | 6/2004 | Stockmaster | |

(Continued)

FOREIGN PATENT DOCUMENTS

JP    03-234128 A  * 10/1991

OTHER PUBLICATIONS

Mitigation of Siganl Biases Introlduced by Controlled Reception Pattern Antennas in a High Integrity Carrier Phase Differential GPS System by Ung Suok Kim; PhD dissertation, Stanford Univ., published Mar. 2007, 137 pages. Pages cited in Office Action: pp. 70-74.*

(Continued)

*Primary Examiner* — Thomas Tarcza
*Assistant Examiner* — John Vigushin
(74) *Attorney, Agent, or Firm* — Christie, Parker & Hale, LLP

(57) ABSTRACT

This invention discloses a method for enhancing a Global Navigation Satellite System (GNSS), such as Global Positioning System (GPS), location calculation by supplying carrier phase corrections within a GNSS receiver used with a multiple element Controlled Reception Pattern Antenna (CRPA) receiver. GNSS carrier phase measurements should be compensated for receiver hardware and directionally dependent antenna errors to obtain desired accuracies for high precision GNSS positioning applications. One technique successfully employed in Fixed Reception Pattern Antenna (FRPA) GPS sensors applies a simple directionally dependent set of correction factors to the measurement outputs. For the complex case of a GNSS receiver employing a CRPA and dynamic beam steering, however, the multiplicity of combinations of antenna element outputs makes the FRPA compensation technique impractical. Compensation of carrier phase measurements is a problem not addressed in previous GPS CRPA beam steering sensors.

14 Claims, 3 Drawing Sheets

U.S. PATENT DOCUMENTS

| | | |
|---|---|---|
| 6,828,935 B1 | 12/2004 | Dunn et al. |
| 6,847,328 B1 | 1/2005 | Libonati et al. |
| 6,965,816 B2 | 11/2005 | Walker |
| 6,992,643 B2 | 1/2006 | Fox et al. |
| 6,999,027 B1 | 2/2006 | Stockmaster |
| 7,015,858 B2 | 3/2006 | Fuchser et al. |
| 7,106,249 B2 * | 9/2006 | Kubo et al. .................. 342/174 |
| 7,161,528 B2 | 1/2007 | Kirby et al. |
| 7,181,247 B1 | 2/2007 | Melick et al. |
| 7,212,921 B2 | 5/2007 | Jeerage et al. |
| 7,304,605 B2 * | 12/2007 | Wells ....................... 342/357.62 |
| 7,324,064 B2 | 1/2008 | Fox et al. |
| 7,336,736 B2 | 2/2008 | Leblond et al. |
| 7,340,283 B1 | 3/2008 | Melick et al. |
| 7,382,313 B1 | 6/2008 | Goad |
| 7,440,988 B2 | 10/2008 | Grobert |
| 7,525,482 B1 * | 4/2009 | Lackey et al. ................ 342/368 |
| 2005/0159891 A1 * | 7/2005 | Cohen et al. ................. 701/213 |
| 2009/0066574 A1 * | 3/2009 | De Lorenzo et al. ..... 342/357.12 |

OTHER PUBLICATIONS

Mader, "GPS Antenna Calibration at the National Geodetic Survey", Silver Spring, MD (date unknown) (10 pgs.).

GPS Antenna Calibration, "Calibrated Antennas:", http://www.ngs.noaa.gov/ANTCAL/, Jun. 11, 2009 (1 pg.).

European Search Report; Application No. 11152542.4-1248; dated Jul. 15, 2011 7 pages.

Kim, U.S.; Mitigation of Signal Biases Introduced by Controlled Reception Pattern Antennas in a High Integrity Carrier Phase Differential GPS System; A Dissertation Submitted to the Department of Aeronautics and Astronautics and the Committee on Graduate Studies of Stanford University in Partial Fulfillment of the Requirements for the Degree of Doctor of Philosophy; Mar. 2007; 150 pages.

* cited by examiner (CRPA)

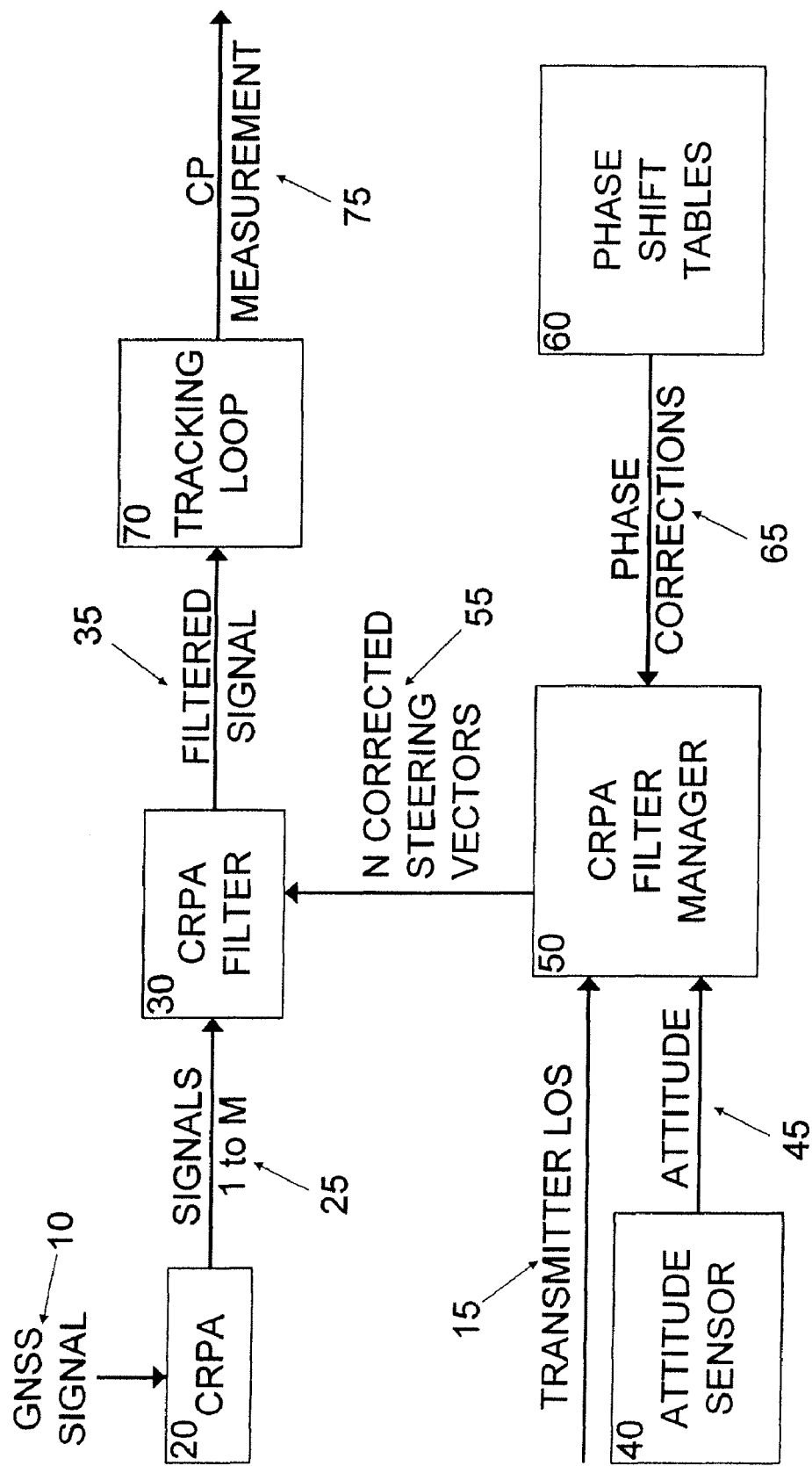

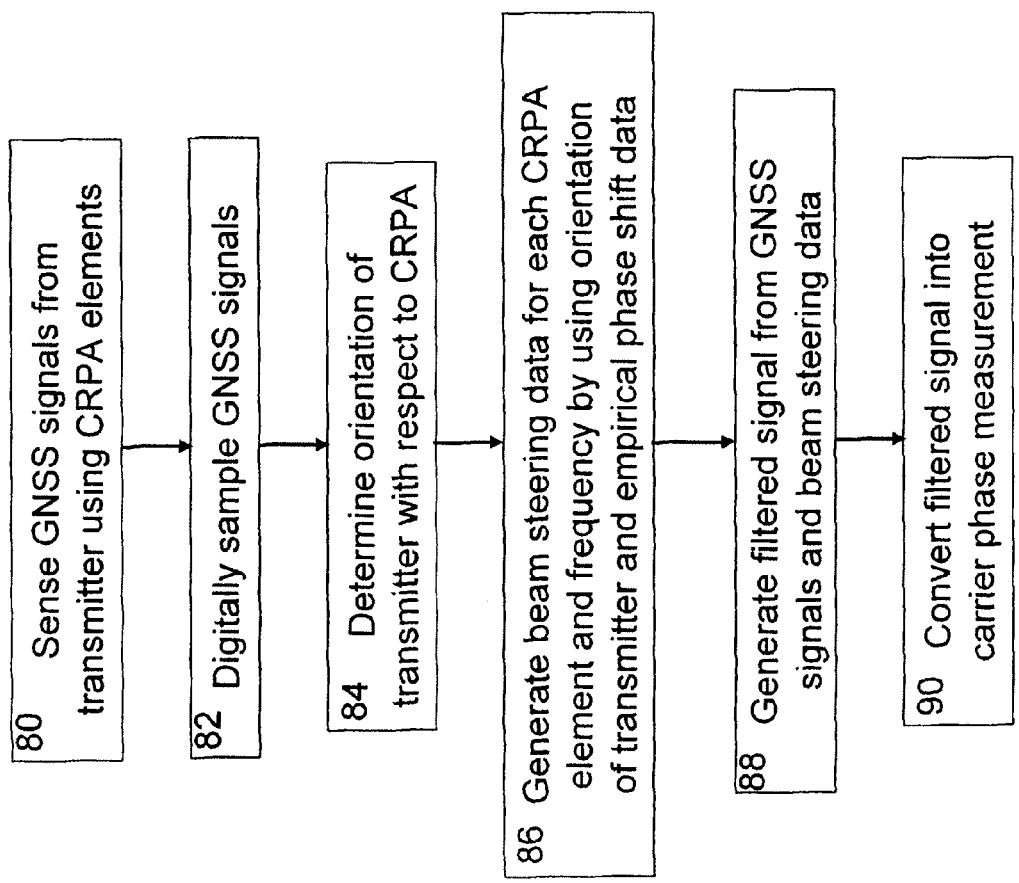

FIG. 3

80 Sense GNSS signals from transmitter using CRPA elements

82 Digitally sample GNSS signals

84 Determine orientation of transmitter with respect to CRPA

86 Generate beam steering data for each CRPA element and frequency by using orientation of transmitter and empirical phase shift data 88 Generate filtered signal from GNSS signals and beam steering data 90 Convert filtered signal into carrier phase measurement

SYSTEM AND METHOD FOR CORRECTING GLOBAL NAVIGATION SATELLITE SYSTEM CARRIER PHASE MEASUREMENTS IN RECEIVERS HAVING CONTROLLED RECEPTION PATTERN ANTENNAS

STATEMENT REGARDING FEDERALLY SPONSORED RESEARCH OR DEVELOPMENT

This invention was made with government support under Contract No. N00019-02-C-3002 awarded by the Department of the Navy. The government has certain rights to this invention.

CROSS-REFERENCE TO RELATED APPLICATION(S)

This application is related to U.S. patent application Ser. No. 12/548,387, entitled "SYSTEM AND METHOD FOR CORRECTING GLOBAL NAVIGATION SATELLITE SYSTEM PSEUDORANGE MEASUREMENTS IN RECEIVERS HAVING CONTROLLED RECEPTION PATTERN ANTENNAS," filed Aug. 26, 2009 in the United States Patent and Trademark Office, the entire content of which is incorporated herein by reference.

BACKGROUND OF THE INVENTION

1. Field of the Invention

The present invention relates to the field of Global Navigation Satellite Systems (GNSS), such as the Global Positioning System (GPS), and, more particularly, to carrier phase measurements in such systems.

2. Description of the Related Art

Global Navigation Satellite Systems (GNSS) use a constellation of dispersed satellites with atomic clocks orbiting the Earth that transmit predictable signals at exact times. The modulation used by these signals and the data messages included enable the receivers to determine highly accurate navigational locations anywhere on the Earth. The receiver calculates its position by carefully measuring the time of arrival of the signals sent by several of the satellites. Each satellite continually transmits messages containing the time the message was sent, precise orbital information, and the general system health and approximate orbits of all the satellites. By calculating the difference between the broadcast "transmit time" and the received "time of arrival," a time of propagation can be determined and transformed into a range using the speed of propagation "c".

GNSS is considered a dual-use technology, namely, a technology that has significant civilian and military applications. Accordingly, for an example GNSS like the Global Positioning System (GPS), the satellites broadcast on precisely defined carrier frequencies with well-defined modulation. The GPS data and timing signals intended for everyone's use have a publicly-defined format contained in Interface Specification IS-GPS-200, available at http://www.navcen.uscg.gov/gps/geninfo/IS-GPS-200D.pdf, and are unencrypted, while those timing signals intended for military use are not publicly defined and are encrypted and the military specific information content is also encrypted. The satellite employs a pseudorandom code, which is used to modulate the carrier frequency in order to transmit the precise time marks. The carrier frequencies are over 1 GHz, while the code rates are considerably lower. GPS chip rates are roughly 10 MHz for the military code and 1 MHz for the civilian code. Additionally, data messages containing satellite orbit, system health, and other necessary information, are transmitted at even a lower rate of 50 bits per second.

Most conventional civilian navigational systems receive a GNSS signal through a single element fixed reception pattern antenna (FRPA) coupled to the receiver. Many military systems, however, use a multiple element controlled reception pattern antenna (CRPA) system to receive a GNSS signal. CRPA systems are much more resistant to the effects of intentional jamming of the GNSS frequencies than are FRPA systems and the signals from each of the elements can be coherently added to increase the carrier-to-noise-density ratio ($C/N_O$) over that of a conventional FRPA type antenna for each received signal.

With GNSS, the receiver measures the transit time, using the precise time marks provided by the pseudorandom code, from a satellite and computes the distance to that satellite by multiplying the transit time by the speed of light. These distance computations are called "pseudoranges" since there is almost always a time difference between the atomic satellite clocks used to create the precise time marks and the receiver clocks used to decode the precise time marks. This clock error is common to all measurements since the atomic satellite clocks are all synchronized, and results in a common range error. This common range error is what forms a "pseudorange" from an absolute range. Other effects that give rise to range errors include atmospheric and receiver antenna hardware.

Geometric multilateration is used to pinpoint the receiver's location by combining these pseudoranges with the corresponding locations of the satellites, using the data from at least four different satellites. Four pseudoranges also allow determination of the clock bias associated with the common range error described above, which adds a fourth dimension of uncertainty, when trying to solve for the other three dimensions of a physical location. Nonetheless, other effects that contribute to range measurement errors still remain. Identifying and attempting to account for the multiple sources of errors is an important step to improving the accuracy of locations determined through GNSS.

Atmospheric (i.e., ionospheric and tropospheric) conditions are usually the next most significant source of error. The Earth's atmosphere slows down the speed of the satellite transmissions. These errors can be compensated for in a number of ways. For instance, using satellites that are more directly overhead helps because their transmissions travel through less atmosphere than when using satellites closer to the horizon. In addition, having the satellites transmit on multiple frequencies helps mitigate the ionospheric induced errors since it is frequency-dependent, so can be mitigated by combining the measurements from the two frequencies into a single ionospheric free measurement. Finally, relative posititioning systems, such as Differential GPS, use strategically placed monitor stations at exact locations to determine at any given time what the overall transmission delay (including effects like atmospheric) is for each satellite. These monitor stations then broadcast these delays to all nearby receivers, which then can make the corrections to each of the corresponding satellites.

There are still other effects, most notably receiver antenna hardware, which cannot be compensated through any of the above techniques. To the extent that such effects are not common between different satellites (common errors disappear as part of the clock bias correction calculated when determining location), they can affect the accuracy of the resulting positional calculation. Multiple element receiver antennas add complexity to the mitigation of these non-common errors, because the different elements receive and process the satellite signals with different hardware. Each hardware path contributes a different delay to the overall measured time of reception. Accounting for these more complex differences helps systems using multiple element antennas achieve the same accuracy that single element antennas are capable of achieving.

Because the satellite signals are relatively weak, it is fairly straightforward to intentionally jam such signals, either by increasing the noise floor by transmitting a broadband noise jammer or by attempting to exceed the dynamic range of the receiver hardware with powerful narrowband signals. Additionally, since the satellite signal structure is so precisely defined and predictable, it can be spoofed by a transmission using the same frequencies and signal structure. This is unacceptable for military applications, so they rely on encrypted signals to thwart any spoofed transmissions, but are still susceptible to intentional interference on the same frequencies. Consequently, for military applications, there is a need to reduce the effect of jamming, so the CRPA system is sometimes used in place of the FRPA system.

Intentional interference is usually significantly stronger than actual satellite transmissions. CRPA systems can use techniques such as nulling (combining the signals received by the CRPA's elements in such a way as to make the jamming signal cancel itself out) or beam steering (combining the signals received by the CRPA's elements in such a way as to amplify the satellite signal) to overcome intentional jamming. Note that beam steering doesn't physically direct the antenna hardware, rather it uses phased array techniques to compensate for the phase of arrival difference caused by the different path length to each element from any satellite to make the signals from each antenna element phase coherent so they add together in amplitude. Also note that it is possible to perform nulling and beam steering at the same time.

GNSS carrier frequencies (for example, military GPS receivers use two carrier frequencies, L1=1.57542 GHz and L2=1.2276 GHz, and a third GPS frequency is being added, L5=1.17645 GHz) have very short wavelengths, for instance, GPS L1 has a wavelength of 19.0 cm while GPS L2 has a wavelength of 24.4 cm. Sophisticated equipment can resolve down to a fraction of these wavelengths, producing extremely precise and accurate range measurements. The problem is that the phase center of reception of such waves can be difficult to determine for multiple element antennas tracking satellites from different angles. Without compensation, this effect contributes error when performing GNSS carrier phase measurements.

GNSS carrier phase measurements should be compensated for receiver hardware and directionally dependent antenna errors to obtain desired accuracies for high precision GNSS positioning applications. High accuracy carrier phase correction techniques implemented in the measurement domain have existed for a number of years. See, for example, Gerald L. Mader, GPS Antenna Calibration at the National Geodetic Survey, available at http://www.ngs.noaa.gov/ANTCAL/images/summary.html, the entire content of which is herein incorporated by reference. These techniques are usually based upon the GPS antenna phase-correction methodology pioneered by National Geodetic Survey (NGS), and are primarily applicable to GPS receivers that employ FRPAs. See the NGS home page at http://www.ngs.noaa.gov/ANTCAL/ for further FRPA error correction technical background.

To obtain the highest accuracy from GNSS carrier phase measurements, non-common receiver hardware induced errors and antenna induced errors dependent upon line of sight (LOS) angle to the satellite (azimuth and elevation) must be removed by compensation of the carrier phase measurements. This problem is not as significant an issue in FRPA GNSS sensors because it is straightforward to solve by subtracting the directionally dependent antenna errors from the carrier phase measurements, as disclosed by Mader above. However, for the complex case of a GNSS receiver employing a CRPA and dynamic beam steering, the multiplicity of combinations of antenna element outputs makes compensation more difficult, as the simple subtraction used for FRPA compensation does not work with a CRPA. Compensation of carrier phase measurements for such errors is a problem not addressed in previous GNSS CRPA beam steering sensors.

Therefore, with the conversion from the FRPA based systems to the CRPA systems for GNSS applications, there is a need to better compensate for the effects of antenna element errors on carrier phase measurement errors.

SUMMARY OF THE INVENTION

Embodiments of the present invention provide a system and method for correcting errors in GNSS carrier phase measurements that use CRPA receiver systems. The method is implemented as a correction to the beam steering vectors, such that the correction to the carrier phase for each of the beams is inherently a part of the beam forming process when beam steering is active. One advantage of this approach is that the carrier phase measurements are fully compensated (for the primary beam satellite for each beam) prior to the input of the signals to the GNSS processing device for processing in the GNSS tracking loop software.

The compensation technique uses azimuth- and elevation-dependent sky map correction constants for each satellite. These constants are based on the antenna-referenced azimuth and elevation of the satellite, as well as for each carrier frequency (e.g., GPS L1=1.57542 GHz and L2=1.2276 GHz), to compute the beam steering (steering vectors) output to the beamformer devices, such as Field Programmable Gate Arrays. To compensate for vehicle motion, these beam steering vectors are computer updated for platform roll/pitch/heading changes at a rapid rate such as 25 Hz.

Exemplary embodiments of the present invention provide for operating configurations for CRPA signal processing modes, including beam steering, and adaptive nulling with beam steering.

In an exemplary embodiment according to the present invention, an apparatus for calibrating a global navigation satellite system (GNSS) receiver for errors in carrier phase measurements of GNSS transmitter signals is provided. The apparatus includes: a controlled reception pattern antenna (CRPA) including a plurality of receiving elements and configured to sense a plurality of signals from a GNSS transmitter; a digital sampler circuit configured to convert the plurality of sensed GNSS signals to a plurality of sampled digital signals; and a digital processor. The digital processor is configured to: access phase calibration correction data for at least some combinations of the plurality of receiving elements and a plurality of transmitter orientations with respect to the CRPA; generate beam steering control data using a transmitter orientation with respect to the CRPA; combine the phase calibration correction data specific to the transmitter orientation with respect to the CRPA and each of the plurality of receiving elements together with the beam steering control data to generate corrected beam steering control data; generate a composite corrected digital signal by combining the sampled digital signals and the corrected beam steering control data; and convert the composite corrected digital signal into a corrected GNSS carrier phase measurement.

The CRPA may be further configured to sense the plurality of signals from a plurality of GNSS transmitters using one or more transmitter frequencies. The digital processor may be further configured to: access phase calibration correction data for at least some combinations of the plurality of receiving elements, the plurality of transmitter orientations with respect to the CRPA, and the one or more transmitter frequencies; generate a plurality of beam steering control data at each of the one or more transmitter frequencies for the respective plurality of GNSS transmitters using respective transmitter orientations with respect to the CRPA; combine the phase calibration correction data specific to the transmitter orientations with respect to the CRPA, the transmitter frequency, and each of the plurality of receiving elements together with the plurality of beam steering control data at each of the one or more transmitter frequencies to generate a plurality of corrected beam steering control data at each of the one or more transmitter frequencies; and generate a composite corrected digital signal for each of the plurality of GNSS transmitters at each of the one or more transmitter frequencies by combining the sampled digital signals and the plurality of corrected beam steering control data at each of the one or more transmitter frequencies.

The apparatus may further include an orientation processor configured to determine the orientation of the transmitter with respect to the CRPA for each of the plurality of GNSS transmitters.

In another exemplary embodiment according to the present invention, a method for calibrating a global navigation satellite system (GNSS) receiver for errors in carrier phase measurements of GNSS transmitter signals is provided. The method includes: sensing a plurality of signals from a GNSS transmitter with a controlled reception pattern antenna (CRPA) including a plurality of receiving elements; digitally sampling the sensed GNSS signals to produce a plurality of sampled digital signals; accessing phase calibration correction data for at least some combinations of the plurality of receiving elements and a plurality of transmitter orientations with respect to the CRPA; generating beam steering control data using a transmitter orientation with respect to the CRPA; combining the phase calibration correction data specific to the transmitter orientation with respect to the CRPA and each of the plurality of receiving elements together with the beam steering control data to generate corrected beam steering control data; generating a composite corrected digital signal by combining the sampled digital signals and the corrected beam steering control data; converting the composite corrected digital signal into a corrected GNSS carrier phase measurement.

The CRPA may be further configured to sense the plurality of signals from a plurality of GNSS transmitters using one or more transmitter frequencies. The method may further include: determining the transmitter orientation with respect to the CRPA for each of the plurality of GNSS transmitters; accessing phase calibration correction data for at least some combinations of the plurality of receiving elements, the plurality of transmitter orientations with respect to the CRPA, and the one or more transmitter frequencies; generating a plurality of beam steering control data at each of the one or more transmitter frequencies for the respective plurality of GNSS transmitters using the respective transmitter orientations with respect to the CRPA; combining the phase calibration correction data specific to the transmitter orientations with respect to the CRPA, the transmitter frequency, and each of the plurality of receiving elements together with the plurality of beam steering control data at each of the one or more transmitter frequencies to generate a plurality of corrected beam steering control data at each of the one or more transmitter frequencies; and generating a composite corrected digital signal for each of the plurality of GNSS transmitters at each of the one or more transmitter frequencies by combining the sampled digital signals and the plurality of corrected beam steering control data at each of the one or more transmitter frequencies.

BRIEF DESCRIPTION OF THE DRAWINGS

The accompanying drawings illustrate embodiments of the present invention, and together with the description, serve to explain the principles of the embodiments of the present invention.

FIG. 2 depicts how a receiver corrects carrier phase measurements in accordance with the present invention when the antenna is a CRPA.

FIG. 3 is an exemplary GNSS CRPA carrier phase correction method according to the present invention.

DETAILED DESCRIPTION

Figure 1:
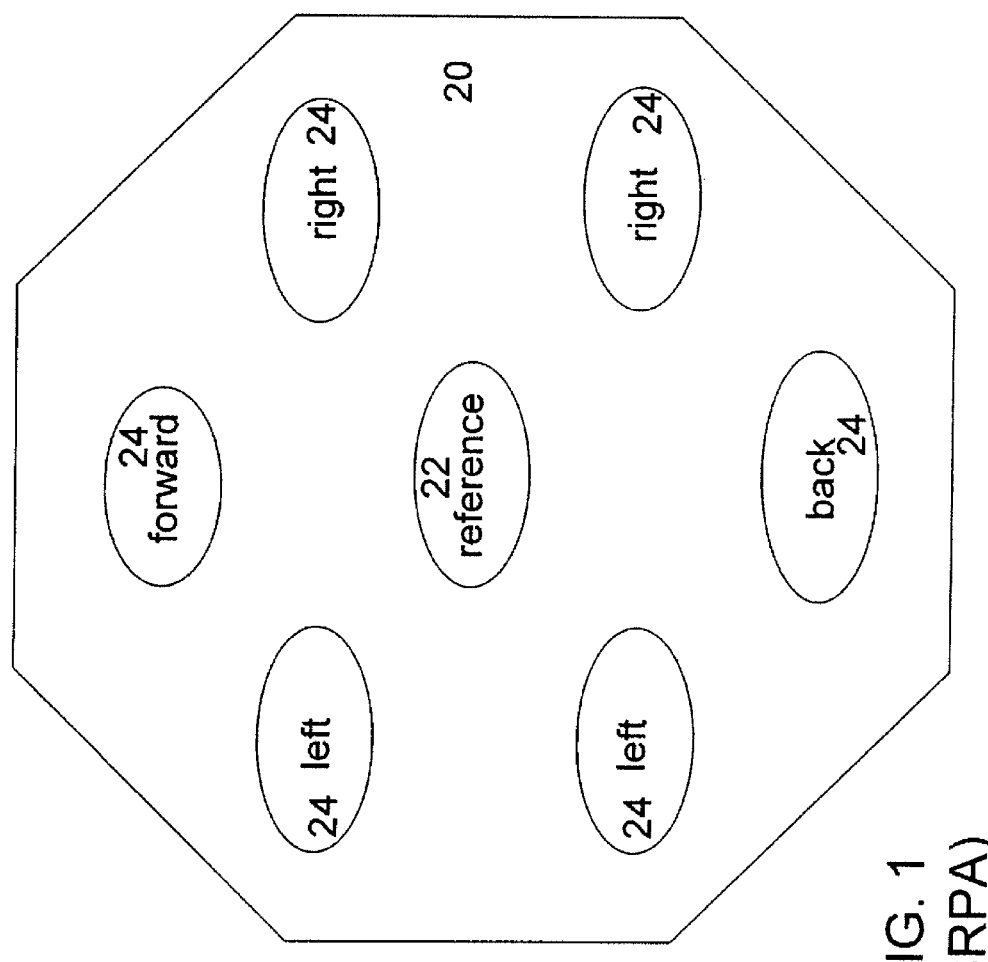
FIG. 1 is an example CRPA layout according to one embodiment of the invention.

The illustrative embodiments that follow are only exemplary applications of the present invention and not intended to limit the scope of the invention.

A preferred embodiment of the invention comprises a GNSS CRPA receiver system on a dynamic platform, such as an aircraft. FIG. 1 shows an exemplary CRPA 20 comprising seven antenna elements (channels). In FIG. 1, the seven elements are comprised of one reference element 22 and six auxiliary elements 24, where the reference element 22 is the principal element centered with respect to the seven elements while the six auxiliary elements 24 surround the reference element 22 in a symmetrical layout: one forward, one back, two on the left, and two on the right. Note that a CRPA may consist of other numbers of elements, and the elements may differ in relative orientation, which may be either symmetric or asymmetric.

Referring now to FIG. 2, CRPA 20 receives a signal 10 from one or more radio navigation transmitters, such as GNSS satellites. The CRPA 20 consists of M antenna elements ($M \geq 2$). Each element receives a signal (Signal 1 through Signal M, for a total of M signals 25) from each transmitter. The receiver digitally samples the M signals 25 and sends them to CRPA filter 30. If the receiver is installed on a dynamic platform, an attitude sensor 40, such as an inertial navigation system, computes the vehicle's (and thereby the CRPA's) attitude 45. If the receiver is static, fixed values of attitude 45 may instead be supplied. CRPA filter manager 50 uses the attitude 45 to transform each transmitter line-of-sight (LOS) vector 15 from navigation coordinates to antenna coordinates. It then computes each of the transmitter's azimuth and elevation angles from the transformed LOS vector and uses those angles to look up the phase corrections 65 in phase shift tables 60, one table for each antenna element. The phase shift tables 60 contain values measured during antenna calibration, indexed by azimuth and elevation.

The CRPA filter manager 50 combines the transmitter LOS vector 15 along with the attitude 45 and antenna calibration corrections 65 for each element of the M antenna elements to compute N steering vectors 55, where $N = B \times N_f$ for B beams (one beam per transmitter) at each of $N_f$ transmitter frequencies, that are used by the CRPA filter 30 to optimally combine the M antenna elements for each of the B beams to be pointed along the LOS of B of the transmitters desired to be received.

The CRPA filter 30 computes weights from the corrected steering vector 55 (and in some cases from the signals 25 as well) and uses the weights to compute a filtered signal 35 from the N input signals 25. The receiver sends the filtered signal 35 to a tracking loop 70, which tracks the signal's carrier and forms a carrier phase (CP) measurement 75.

The CRPA filter manager 50 computes each of the N steering vectors 55 that are used by the CRPA filter 30. A steering vector consists of M complex numbers of the form $e^{i\theta_m}$ (m=1, 2, ..., M), where $\theta_m$ is the receiver's predicted value of the phase (in radians) of the $m^{th}$ CRPA channel's output signal for a given transmitter at a given frequency. The role of the steering vector is to (1) increase the antenna's gain toward the selected transmitter and (2) preserve the phase of the transmitter's signal. The phase of a channel's output is determined by the corresponding antenna element's location, its phase shift, and the phase shifts of any cables and analog filters that are part of the channel. The CRPA filter manager computes $\theta_m$ by the following formula:

$$\theta_m = LOS \cdot (A_m + \delta A_{mf}) \frac{2\pi}{\lambda_f} + \varepsilon_{mf}(AZ, EL) + \phi_{mf} + \Phi_{mf}$$

LOS is the line-of-sight unit vector from the receiver to the satellite in antenna coordinates. $A_m$ is the vector from CRPA's reference element (e.g., element 22 in FIG. 1) to the $m^{th}$ element ($A_1=0$), measured between their mechanical centers, and expressed in antenna coordinates. $\delta A_{mf}$ is the vector from the $m^{th}$ CRPA element's mechanical center to its electrical phase center using frequency f. The electrical phase center is the antenna element's mean effective reference point, averaged over all possible signal angles of arrival. The f subscript is needed because the element's phase center location may be different at different signal frequencies. In the case of military GPS, f denotes one of the two carrier frequencies: L1=1575.42 MHz and L2=1227.60 MHz. $\lambda_f$ is the signal's wavelength. $\varepsilon_{mf}(AZ,EL)$ is the $m^{th}$ element's directionally dependent phase shift at frequency f for signals arriving from azimuth AZ and elevation EL. $\varepsilon_{mf}$ is commonly known as "phase center variation." $\phi_{mf}$ is the phase shift contributed by the internal cables and analog filters. $\Phi_{mf}$ is the phase shift contributed by the external cables and antenna elements, and includes the "phase wind-up" bias caused by the azimuth of the $m^{th}$ element within the CRPA array, if the antennas are circularly polarized, such as those often used by GPS receivers.

The $A_m$ term in the formula is used by any CRPA that steers a beam toward a transmitter. Thus, the $\delta A$, $\varepsilon$, $\phi$, and $\Phi$ terms are used to form the phase correction. These terms are obtained by calibrating the antenna elements and the CRPA channels. Each of the M antenna elements is calibrated separately, using a variant of the standard technique described by Mader for calibrating a FRPA. This technique, which involves holding the antenna fixed at a known position and recording carrier phase measurements (at all relevant frequencies) as the satellites move along their orbits, determines $\delta A$ and $\varepsilon$. The CRPA channels may be calibrated by a number of known techniques, including, for example, feeding identical carrier wave signals into all channels and measuring the phase differences at their outputs.

In a preferred embodiment, $\delta A$, $\varepsilon$, $\phi$, and $\Phi$ are stored in look-up tables, each with its own indexing scheme. Note that other storage schemes are possible. The $\delta A$ table is $N_f \times M \times 3$, where $N_f$ is the number of distinct carrier frequencies (2 for military GPS) and M is the number of antenna elements. The three table entries hold the x, y, and z components of the $\delta A$ vector. The $\varepsilon$ table is $N_f \times M \times N_a \times N_e$, where $N_a$ and $N_e$ are the numbers of azimuth and elevation bins into which the antenna's field of view is divided. For example, if the table spans the antenna's visible hemisphere and the bin size is 5°×5°, then $N_a=360°/5°=72$ and $N_e=90°/5°=18$. The $\phi$ and $\Phi$ tables are each $N_f \times M$.

FIG. 3 shows an example method of correcting CRPA GNSS carrier phase errors according to the present invention, where the CRPA is mounted in a vehicle. It starts with sensing GNSS transmitter signals in step 80 using a CRPA, each element sensing its own GNSS signals. Next, the signals are digitally sampled in step 82 so that mathematical operations can be performed on them. In step 84, the line-of-sight (LOS) is determined from the CRPA to the transmitter (satellite), using such variables as the current location of the transmitter with respect to the vehicle and the orientation of the CRPA within the vehicle. From this, phase corrections are looked up in step 86, using tables of values measured during antenna calibration, and combined with the transmitter—CRPA orientation information to produce steering vectors to combine the separate GNSS signals into one signal. This combining takes place in step 88, resulting in a filtered signal that combines and corrects all of the individual element signals so that they preserve the transmitter's signal phase. Finally, in step 90, this filtered signal is sent to a tracking loop, which is able to track the signal's carrier and form a carrier phase measurement.

Carrier Phase Correction Factor Definition

In an exemplary embodiment of the invention, there are three sets of correction factors in the GNSS correction scheme (that is, three tables of constants), covering corrections for each of three different effects on the carrier phase. The tables are different sized, depending on the effect for which they are compensating. The effects, and their corresponding correction tables and table sizes, are discussed separately. Assume in this embodiment that the CRPA is as in FIG. 1, that the CRPA is mounted in an aircraft, and that there are two separate frequencies employed in the GNSS.

1. Inter-Channel Carrier Phase Delays

The first effect is the inter-channel phase delays, both internal and external. This set of phase correction factors is intended to provide carrier phase corrections to compensate for inter-channel phase delays between the reference channel and the six auxiliary channels. These phase delays would be expected to result primarily from differential phase delays in analog electrical components in the internal RF circuitry and by the external cables and antenna elements.

There are 14 different factors in the internal correction term $\phi_{mf}$, one factor for each combination of frequency (two) and antenna element (seven). While it could be implemented using only 12 factors (the reference element factors could be implicitly zero, since these delays are relative to the reference element), using 14 factors provides more symmetry. It also allows these factors to incorporate an offset common to all the antenna elements. Similarly, there are 14 different factors in the external correction term $\Phi_{mf}$, one factor for each combination of frequency (two) and antenna element (seven).

These correction factors can be determined during initial testing, under conditions where all other effects that would create a difference between antenna elements are either eliminated or more completely understood.

2. CRPA Phase Center Locations (Coordinate Offsets)

The next effect is the location of the different CRPA phase centers. It is from the phase center that an antenna element observes a carrier wave, so both the antenna's location and the carrier frequency play a role in this effect. Thus, in this embodiment, there are 84 different coordinates: three coordinates (distance offsets, one for each dimension) for each of 14 different combinations of antenna elements (seven) and frequencies (two). These coordinate offsets are with respect to the mechanical center reference point (a point at the top center surface) of the CRPA assembly.

This set of mean phase center coordinate offsets is intended to provide coordinate offsets to account for the differential coordinate positions between the mechanical reference point and the electrical reference point of each of the seven CRPA elements. It results primarily from mean differential phase delays in the antenna elements that vary with the two frequencies, and the element physical location on the antenna. That is, the factors account for the effects of antenna location and carrier frequency on the location of the corresponding phase center.

The process of finding these phase centers is analogous to the single element antennas, as discussed in the Mader reference above, only for each of the seven elements in the CRPA. The process is sometimes referred to as "finding the mean phase center offset" of the antenna, or "calibrating the mean electrical phase center" of the antenna. These terms and processes are synonymous.

3. Sky Map Carrier-Phase Corrections

The third effect is that of the location of satellite in the sky on the different CRPA phase centers. This can necessitate a correction in the carrier wave phase that is also dependent on antenna element and frequency, along with azimuth (horizontal) and elevation (vertical) angles to the satellite with respect to the horizon. While antenna and frequency create the 14 combinations discussed in the above effects, azimuth and elevation can create a potentially infinite number of combinations. One practical way to limit this in this embodiment is to consider only azimuths and elevations in ranges of n degrees, thus producing 360/n azimuth bins and 90/n elevation bins, where n is the azimuth/elevation bin size in degrees, and, for example, may be a number between 1 and 5 degrees. This limits the total number of combinations (factors) to 14×360/n×90/n.

Note that n does not have to be the same for azimuth and elevation. For instance, most ground based FRPA systems exhibit little bias in azimuth, so even one bin may suffice for azimuth. The classic approach in the high precision phase community used for many years has been to primarily use 5-degree elevation bins (e.g., the National Geodetic Survey (NGS) phase correction models discussed in Mader above) with no azimuth dependency. These classic applications, however, employ FRPA antennas that in the vast majority of cases are symmetric in azimuth. Because some less predictable interactions between antenna elements in a CRPA exist, it is safer to design for such azimuthal dependent effects.

In fact, n does not even have to be the same between elements, though it does add to complexity if it were allowed to vary between different antenna elements. For example, experience shows that the center reference element varies symmetrically in azimuth compared to the auxiliary elements. Thus, a single 360-degree azimuth bin size might suffice for the reference element. Since in this embodiment, the auxiliary elements are not necessarily mounted symmetrically with respect to the CRPA housing or even necessarily with respect to the aircraft, some variation with azimuth would be expected.

For a smaller bin size (for example, if both elevation bin size and azimuth bin size are 1 degree), the required number of bins is 14×360×90=453,600. Note that one would not expect the lower 90 degrees of elevation (i.e., below the horizon) to be practical to calibrate or use for phase positioning, thus the number of elevation bins is limited by the 90 degree span of useful elevation in a preferred embodiment.

In contrast, for a full 5-degree bin count for both elevation and azimuth bin size, the required number of bins is 14×72×18=18,144. This bin count is considerably reduced compared to using a 1-degree bin size.

This set of phase correction factors is intended to provide directionally dependent carrier phase corrections to account for residual differential phase delays between the mean electrical phase center of a benchmark calibration reference (e.g., a FRPA choke ring antenna, as discussed by Mader) and the mean electrical phase center of each of the seven exemplary CRPA antenna elements—the reference element and the six auxiliary elements—and would be expected to result primarily from differential phase delays in the antenna elements that vary with the two frequencies, the element's physical location on the antenna, and the line-of-sight azimuth and elevation pointing angle from each element to the satellite.

This process is sometimes referred to as "correcting the phase center variation" of the antenna, or "calibrating the electrical phase center" of the antenna with respect to the "mean electrical phase center" of the antenna. These terms and processes are synonymous.

Carrier Phase Correction Factor Application

The application of the carrier phase correction factors to line of sight measurements in this embodiment is now discussed in reference to using beam steering (with or without adaptive nulling).

One existing function of beam steering in a preferred embodiment is to compensate for the differential line of sight signal path length between each of the six auxiliary antenna elements surrounding the reference antenna element, such that the virtual line of sight signal path length for each auxiliary element is equivalent to the reference element. This is what it means to "steer" the beam in the direction of the signal. No physical movement of antenna elements takes place. Rather, the signal measurements from each antenna element are delayed appropriately to cause them to line up with the reference signal as if all the antenna elements were physically located at the same distance from the signal source. Beam steering can be thought as directing a phased-array antenna at a particular satellite. This would be done independently for each satellite that is being tracked up to the maximum number of beams supported by the design.

The beam steering compensation should preferably take place in all three dimensions. Note that this will require the element-to-element phase differences for the different azimuth and elevation portions of the sky. In addition, in order to better characterize the CRPA receiver system, it will need to be tested to collect relative phase measurements with the antenna installed on some aircraft-like ground plane, and these measured values will be used to support beam steering instead of the algorithmically determined values.

Additionally, the receiver system should sum the following beam steering compensation parameters, as described above: (1) inter-channel (RF channel) carrier phase delays, (2) phase center locations (coordinate offsets), and (3) sky map carrier phase corrections, where the azimuth and elevation angles are the aircraft coordinate relative line-of-sight pointing angles to the primary satellite for that beam.

The foregoing description has provided by way of exemplary and non-limiting examples a full and informative description of the exemplary embodiments of this invention. For example, though reference is made to several processing units, it can be understood by one skilled in the art that some or all of these processing units can be combined into a single processing unit without departing from the scope of the invention. Various modifications and adaptations may become apparent to those skilled in the relevant art in view of the foregoing description, when read in conjunction with the accompanying drawings and the appended claims. However, all such and similar modifications of the teachings of this invention will still fall within the scope of this invention.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. An apparatus for calibrating a global navigation satellite system (GNSS) receiver for receiver or antenna hardware induced direct path signal errors in carrier phase measurements of GNSS transmitter direct path signals when tracking the GNSS transmitter direct path signals, the apparatus comprising:
   a controlled reception pattern antenna (CRPA) comprising a plurality of receiving elements and configured to sense a plurality of direct path signals from a GNSS transmitter;
   a digital sampler circuit configured to convert the plurality of sensed GNSS direct path signals to a plurality of sampled digital signals; and
   a digital processor configured to:
      access stored direct path phase calibration correction data for at least some combinations of the plurality of receiving elements and a plurality of transmitter orientations with respect to the CRPA;
      generate direct path beam steering control data using a transmitter orientation with respect to the CRPA;
      combine the accessed direct path phase calibration correction data specific to the transmitter orientation with respect to the CRPA and each of the plurality of receiving elements together with the direct path beam steering control data to generate corrected direct path beam steering control data;
      generate a composite corrected direct path digital signal by combining the sampled digital signals and the corrected direct path beam steering control data; and
      convert the composite corrected direct path digital signal into a corrected direct path GNSS carrier phase measurement.

2. The apparatus of claim 1, wherein the CRPA is further configured to sense the plurality of direct path signals from a plurality of GNSS transmitters using one or more transmitter frequencies, and the digital processor is further configured to:
   access stored direct path phase calibration correction data for at least some combinations of the plurality of receiving elements, the plurality of transmitter orientations with respect to the CRPA, and the one or more transmitter frequencies;
   generate a plurality of direct path beam steering control data at each of the one or more transmitter frequencies for the respective plurality of GNSS transmitters using respective transmitter orientations with respect to the CRPA;
   combine the accessed direct path phase calibration correction data specific to the transmitter orientations with respect to the CRPA, the transmitter frequency, and each of the plurality of receiving elements together with the plurality of direct path beam steering control data at each of the one or more transmitter frequencies to generate a plurality of corrected direct path beam steering control data at each of the one or more transmitter frequencies; and
   generate a composite corrected direct path digital signal for each of the plurality of GNSS transmitters at each of the one or more transmitter frequencies by combining the sampled digital signals and the plurality of corrected direct path beam steering control data at each of the one or more transmitter frequencies.

3. The apparatus of claim 2, further comprising an orientation processor configured to determine the orientation of the transmitter with respect to the CRPA for each of the plurality of GNSS transmitters.

4. The apparatus of claim 2, wherein the apparatus is configured to perform in real time.

5. The apparatus of claim 2, wherein the GNSS is the Global Positioning System (GPS).

6. The apparatus of claim 2, wherein the CRPA has seven elements.

7. The apparatus of claim 2, wherein the apparatus is mounted on a static platform.

8. The apparatus of claim 2, wherein the apparatus is mounted on a dynamic platform.

9. The apparatus of claim 8, wherein the apparatus is mounted on an aircraft, ship, or land vehicle and wherein the apparatus determines the direct path beam steering control data accounting for a variable attitude of the dynamic platform.

10. A method for calibrating a global navigation satellite system (GNSS) receiver for receiver or antenna hardware induced direct path signal errors in carrier phase measurements of GNSS transmitter direct path signals when tracking the GNSS transmitter direct path signals, the method comprising:
   sensing a plurality of direct path signals from a GNSS transmitter with a controlled reception pattern antenna (CRPA) comprising a plurality of receiving elements;
   digitally sampling the sensed GNSS direct path signals to produce a plurality of sampled digital signals;
   accessing stored direct path phase calibration correction data for at least some combinations of the plurality of receiving elements and a plurality of transmitter orientations with respect to the CRPA;
   generating direct path beam steering control data using a transmitter orientation with respect to the CRPA;
   combining the accessed direct path phase calibration correction data specific to the transmitter orientation with respect to the CRPA and each of the plurality of receiving elements together with the direct path beam steering control data to generate corrected direct path beam steering control data;
   generating a composite corrected direct path digital signal by combining the sampled digital signals and the corrected direct path beam steering control data;
   converting the composite corrected direct path digital signal into a corrected direct path GNSS carrier phase measurement.

11. The method of claim 10, wherein the CRPA is further configured to sense the plurality of direct path signals from a plurality of GNSS transmitters using one or more transmitter frequencies, wherein the method further comprises:
   determining the transmitter orientation with respect to the CRPA for each of the plurality of GNSS transmitters;
   accessing stored direct path phase calibration correction data for at least some combinations of the plurality of receiving elements, the plurality of transmitter orientations with respect to the CRPA, and the one or more transmitter frequencies;
   generating a plurality of direct path beam steering control data at each of the one or more transmitter frequencies for the respective plurality of GNSS transmitters using the respective transmitter orientations with respect to the CRPA;

combining the accessed direct path phase calibration correction data specific to the transmitter orientations with respect to the CRPA, the transmitter frequency, and each of the plurality of receiving elements together with the plurality of direct path beam steering control data at each of the one or more transmitter frequencies to generate a plurality of corrected direct path beam steering control data at each of the one or more transmitter frequencies; and generating a composite corrected direct path digital signal for each of the plurality of GNSS transmitters at each of the one or more transmitter frequencies by combining the sampled digital signals and the plurality of corrected direct path beam steering control data at each of the one or more transmitter frequencies.

12. The method of claim 11, wherein the steps are configured to be performed in real time.

13. The method of claim 11, wherein the determining the orientation of the transmitter with respect to the CRPA for each of the plurality of transmitters comprises accounting for a variable attitude of the CRPA mounted on a dynamic platform.

14. The method of claim 11, wherein the GNSS is the Global Positioning System (GPS).

* * * * *